Sept. 25, 1928.  
H. R. CARVETH  
PROCESS OF CONTROLLING RATE OF OXIDATION  
Filed Jan. 29, 1926  
1,685,520
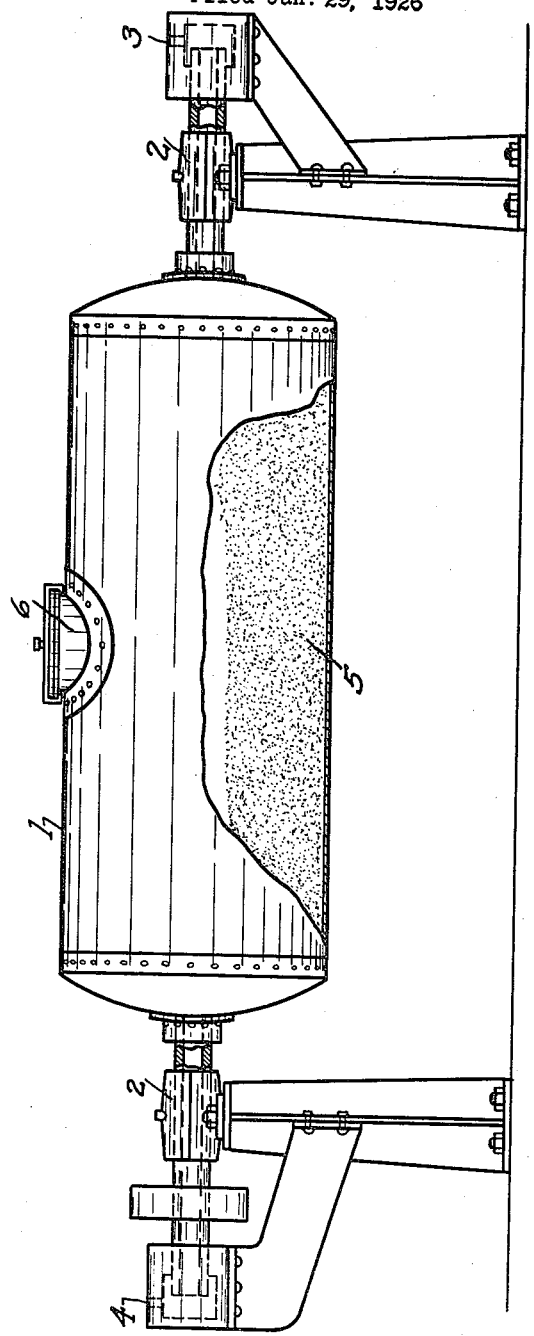
Inventor:  
Hector R. Carveth  
by J. P. Wooster  
Attorney.

Patented Sept. 25, 1928.

1,685,520

UNITED STATES PATENT OFFICE.

HECTOR RUSSELL CARVETH, OF NIAGARA FALLS, NEW YORK, ASSIGNOR TO THE ROESSLER & HASSLACHER CHEMICAL COMPANY, OF NEW YORK, N. Y., A CORPORATION OF NEW YORK.

PROCESS OF CONTROLLING RATE OF OXIDATION.

Application filed January 29, 1926, Serial No. 84,543, and in Germany June 6, 1925.

This invention relates to the reaction of metallic sodium with elementary oxygen for the formation of a solid product consisting substantially of sodium monoxide.

One object of the invention is to produce a finely divided sodium monoxide that is sufficiently porous to be chemically reactive with gases, particularly gaseous oxygen in reactions for production of sodium peroxide. Another object of the invention is to produce sodium monoxide that is sufficiently uniform in quality to permit of its being marketed as a primary product. Another object of the invention is to make possible a reduction of labor and other costs that enter into the final cost of sodium monoxide as a primary or an intermediate product.

Before my invention there were two principal ways of making sodium monoxide, neither one of which was satisfactory as is evidenced by the fact that the product has not hitherto been quoted or marketed. The first method was to expose metallic sodium in shallow layers about one half inch deep to air at temperatures of about 200° C. When the reaction begins a crust of sodium monoxide forms on the molten surface. This crust draws molten metal by capillary action to the surface and therefore into contact with more air which makes further oxidation possible. However, the capillary action is incomplete and eventually it becomes ineffective before all of the metal is oxidized. The upper surfaces of monoxide are oxidized to sodium peroxide, after which no further reaction occurs excepting over time intervals too long for manufacturing purposes. The product therefore consists substantially of three more or less intermixed layers with sodium below, sodium peroxide above, and monoxide in between. This product is disagreeable and even dangerous to handle. When it is being used for the commercial production of either sodium monoxide or sodium peroxide, further handling is necessary, which unavoidably introduces impurities into the final product.

The second method was to react metallic sodium with sodium peroxide. This reaction proceeds vigorously when once started,—too vigorously in fact to be easily controlled. It produces a product that has been fused during the course of manufacture and it is apt to enclose small globules of sodium. The high temperature developed tends to increase corrosion of containing vessels and thereby to detract from the purity of the product. The product is dense but lacking in porosity; even when finely ground it is difficult if not impossible to oxidize completely to sodium peroxide.

Sodium peroxide is one of the important products made from monoxide. It is, therefore, of great importance to have a process for making monoxide of such quality that it can be converted into a high grade of peroxide. Commercial peroxide should be dense, finely ground, exceptionally pure and of high test. The best way to make such peroxide is to oxidize finely divided monoxide of high purity, that is dense but also porous.

In my application #623,901 filed March 9, 1923, subject "Process of conducting and controlling chemical reactions", I disclosed the general principle of using a solid reaction product as a carrier for liquid that is being reacted upon by a gas. This principle permits use of greatly extended surfaces and extremely thin layers of the liquid product upon which the gas is reacting. I have discovered that a surprisingly large amount of metallic sodium, in fact as high as 10% can be absorbed in and diffused by sodium monoxide and that such a mixture does not become pasty but retains all the characteristics of a dry powder. This mixture when oxidized properly furnishes a very superior quality of sodium monoxide.

As stated above I use finely divided sodium monoxide as a carrying medium; to this I introduce metallic sodium so that it will never be in excess of 10% by weight of the total mixture. I prefer a mixture of 10% or less. There is no difficulty in completely oxidizing all of the sodium in the mass and the composition may be allowed to fluctuate between the upper limits of from 5% to 10% sodium down to 0% sodium as the lower limit.

Ordinarily I use air as a source of oxygen. This is introduced into the reaction vessel in such a manner that the oxygen concentration in the reaction vessel is never over a few per cent, preferably well below 10%. By restricting the input of air, I can control the rate of oxidation so that the reaction mass will never become either generally or locally overheated. The temperature should not be permitted to rise above 250° C. It is important that overheating be avoided because overheating gives undesirable physical characteristics to the product of reaction and tends to increase the corrosion of the reacting vessel.

In the accompanying drawing is shown an apparatus for oxidizing sodium to sodium monoxide by my process. One is a revolving retort, made of iron, supported at the ends by bearings 2 and revolved by any suitable means. Air is introduced through 3, and escaping gases pass through 4. A body of pulverulent sodium monoxide, 5, is held in the apparatus. Sodium may be introduced intermittently through 6, and when product is removed, 6 serves as an outlet opening when on the under side.

I wish it to be understood that any suitable means of stirring the pulverulent mass may be employed; also any suitable vessel that provides agitation; any means of maintaining a porous mass wherein sodium may be distributed uniformly and oxygen be permitted to come into contact with all parts of the pulverulent mass, come within the scope of my invention.

Sodium may be added continuously and the product removed continuously if equipment is designed for the purpose, but the process is unaltered by any such changes or modifications. The sodium may be added as liquid or as solid. The heat of reaction is sufficient to melt the solid metal.

When the process is once started, provision is made for unrestricted air radiation. The temperature should not be permitted to rise much above the temperature at which the reaction proceeds smoothly. In the apparatus shown the process is continuous excepting short interruptions when sodium is being introduced or product removed. Heating is unnecessary excepting when the process is first started, and analytical control is unnecessary for successful operation, since there is a distinctive color change when the metallic sodium content of the mass approaches 0%.

What I claim is:

1. The purpose of producing sodium monoxide which consists in absorbing molten sodium in an excess of pulverized sodium monoxide at a reacting temperature and supplying oxygen.

2. The process of producing sodium monoxide which consists in absorbing molten sodium in an excess of pulverized sodium monoxide at a reacting temperature and supplying oxygen at such a rate as to maintain a substantially constant reacting temperature below the vaporization point of sodium.

3. The process of producing sodium monoxide consisting in mixing metallic sodium and finely divided sodium monoxide in proportions that do not produce a pasty mass, agitating, and causing oxygen to react with the metallic sodium in the mixture.

4. The process of producing sodium monoxide consisting in mixing metallic sodium and finely divided sodium monoxide in such proportions as to produce a mixture containing not over 10% uncombined metallic sodium, agitating, and causing oxygen to react with the metallic sodium in the mixture.

5. The process of producing sodium monoxide consisting in agitating a pulverulent mass of solid sodium monoxide and liquid sodium in an atmosphere of nitrogen containing oxygen until all of the sodium is oxidized.

6. The process of producing sodium monoxide consisting in mixing sodium and finely divided sodium monoxide in proportions that do not produce a pasty mass, holding at a temperature between the melting point of sodium and 250° C., agitating and adding oxygen.

7. The process of producing sodium monoxide consisting in mixing sodium and finely divided sodium monoxide in proportions that do not produce a pasty mass, agitating, adding oxygen and removing the heat of reaction to prevent the rise of temperature in the mass above 250° C.

8. The process of producing sodium monoxide consisting in mixing sodium and finely divided sodium monoxide in proportions to produce a mixture holding not over 10% uncombined metallic sodium, holding at a temperature between the melting point of sodium and 250° C., agitating and adding oxygen.

9. The process of producing sodium monoxide consisting in mixing sodium and finely divided sodium monoxide in proportions that do not produce a pasty mass, agitating, treating the mass with a mixture of nitrogen and oxygen, and radiating the heat of reaction to prevent an elevation of temperature above 250° C.

10. The process of producing sodium monoxide consisting in mixing sodium and finely divided sodium monoxide, in proportions that do not produce a pasty mass, agitating, treating the mass with a mixture of nitrogen and not over 10% of oxygen at such a rate that the radiation of heat can prevent a rise of temperature in the mass above 250° C.

11. The process of producing sodium monoxide consisting in mixing sodium and finely divided sodium monoxide in proportions to produce a pulverulent mass holding not over 10% of uncombined metallic sodium, holding at a temperature between the melting point of sodium and 250° C., agitating and subjecting the mass to a mixture of nitrogen with not more than 10% of oxygen.

12. A product of manufacture consisting in a pulverulent mixture comprising a finely divided alkali metal and a pulverulent material inert to said alkali metal.

13. A product of manufacture comprising an intimate pulverulent mixture of finely divided alkali metal and pulverulent alkali metal monoxide.

14. A product of manufacture comprising an intimate pulverulent mixture of finely divided sodium and pulverulent sodium monoxide.

15. A product of manufacture comprising an intimate pulverulent mixture of up to about 10% finely divided sodium and about 90% pulverulent sodium monoxide.

Signed at Perth Amboy, New Jersey, in the county of Middlesex and State of New Jersey, this 27th day of January, A. D. 1926.

HECTOR RUSSELL CARVETH.